United States Patent
Kumazawa

(10) Patent No.: US 9,219,635 B2
(45) Date of Patent: Dec. 22, 2015

(54) SERVER APPARATUS AND PRIVILEGE RECEIVING OPPORTUNITY NOTIFICATION METHOD

(71) Applicant: FUJITSU LIMITED, Kawasaki-shi (JP)

(72) Inventor: Takeshi Kumazawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 13/708,505

(22) Filed: Dec. 7, 2012

(65) Prior Publication Data

US 2013/0262597 A1    Oct. 3, 2013

(30) Foreign Application Priority Data

Mar. 28, 2012    (JP) .................................. 2012-075193

(51) Int. Cl.
  *G06F 15/16*     (2006.01)
  *H04L 29/08*     (2006.01)
  *G06Q 30/02*     (2012.01)

(52) U.S. Cl.
  CPC ............ *H04L 29/0809* (2013.01); *G06Q 30/02* (2013.01)

(58) Field of Classification Search
  USPC ............. 709/206; 705/26.8; 707/10; 713/185
  See application file for complete search history.

(56) References Cited

U.S. PATENT DOCUMENTS

| | | | |
|---|---|---|---|
| 6,772,130 B1 * | 8/2004 | Karbowski et al. | 705/26.1 |
| 6,976,007 B1 * | 12/2005 | Boucher et al. | 705/28 |
| 8,725,794 B2 * | 5/2014 | Kandasamy et al. | 709/203 |
| 2002/0013906 A1 * | 1/2002 | Wallach | G06F 19/322 713/185 |
| 2003/0023480 A1 | 1/2003 | Sakuta | |
| 2004/0122943 A1 * | 6/2004 | Error et al. | 709/224 |
| 2004/0243584 A1 * | 12/2004 | Wesley | G06F 21/10 1/1 |
| 2009/0182643 A1 * | 7/2009 | Holstein et al. | 705/26 |
| 2010/0191550 A1 * | 7/2010 | Hutson | 705/5 |
| 2012/0197700 A1 * | 8/2012 | Kalin | G06Q 30/0633 705/14.23 |
| 2012/0197753 A1 * | 8/2012 | Kalin | G06Q 30/0633 705/26.8 |
| 2013/0262597 A1 * | 10/2013 | Kumazawa | G06Q 30/02 709/206 |

FOREIGN PATENT DOCUMENTS

| | | |
|---|---|---|
| JP | 2000-123105 | 4/2000 |
| JP | 2002-041455 | 2/2002 |
| JP | 2006-259983 | 9/2006 |
| JP | 2011-060022 | 3/2011 |

* cited by examiner

*Primary Examiner* — Tammy Nguyen
(74) *Attorney, Agent, or Firm* — Fujitsu Patent Center

(57) ABSTRACT

A server apparatus includes a memory that stores location information that identifies a second website from which a privilege is granted when the second website is used after having been accessed through a first website; and a processor coupled to the memory. The processor executes first determining whether the location information acquired includes information that is identical to location information that identifies the first website. The processor executes second determining, when it is determined that the information identical to the location information of the first website is not included therein, whether location information of the second website is stored in the memory, the location information being identical to the location information acquired. The processor executes when the identical location information is stored in the memory, generating appeal information with which to appeal for accessing the second website through the first website, and notifying the user of the appeal information.

4 Claims, 8 Drawing Sheets

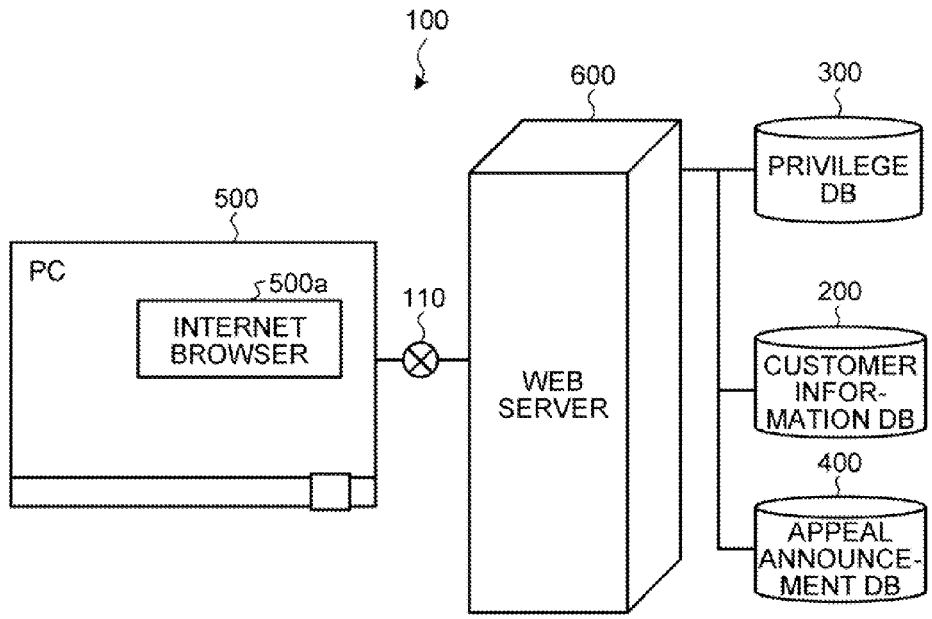

| 1 | USER ID | xxx1 |
|---|---|---|
| 2 | NAME | XXX, YYY |
| 3 | ADDRESS | X PREFECTURE, Y CITY, ... |
| 4 | TELEPHONE NUMBER | 03-xxxx-xxxx |
| 5 | MODEL TYPE NAME OF OWNED MACHINE | a123456789 |
| 6 | MACHINE NUMBER OF OWNED MACHINE | aaabbbccc |
| 7 | AGE RANGE | 40 TO 49 |
| 8 | GENDER | MALE |
| 9 | OCCUPATION | COMPANY EMPLOYEE |
| 10 | BANK ACCOUNT NUMBER | 0abcdef |
| 11 | CREDIT CARD NUMBER | abcd-xxxx-xxxx-xxxx |
| 12 | MODEL TYPE NAME OF CURRENTLY OPERATED MACHINE | a123456789 |
| 13 | MACHINE NUMBER OF CURRENTLY OPERATED MACHINE | aaabbbccc |

FIG.3

| USER ID | ACCESS DATE AND TIME (yyyy/mm/dd/hh/mm) | PRIVILEGE DISCRIM- INATION ID | WEBSITE URL |
|---|---|---|---|
| xxx1 | 2012/01/25/21/33 | 00001 | |
| xxx1 | 2012/01/25/22/08 | | http://aaaa.bbbb.ccc.co.jp/index.html |

FIG.4

| USER ID | PRIVILEGE DISCRIMINATION ID | USAGE COUNT |
|---|---|---|
| xxx1 | 00001 | 2 |

| 1 | PRIVILEGE DISCRIMINATION ID | 00001 |
|---|---|---|
| 2 | PRIVILEGE OFFERING COMPANY NAME | aaa CO., LTD. |
| 3 | WEBSITE NAME | aaa STORE |
| 4 | WEBSITE URL | http://aaaa.bbbb.ccc.co.jp/index.html |
| 5 | PRIVILEGE EXPIRATION DATE | 2012/12/31 |

| PRIVILEGE DISCRIMINATION ID | USAGE COUNT | APPEAL PHRASE |
|---|---|---|
| 00001 | 0 | A PRIVILEGE IS GRANTED ON A PURCHASE MADE THROUGH THE REGISTERED MEMBER WEBSITE |
| 00001 | 1 TO 5 | A 5% DISCOUNT IS APPLIED TO A PURCHASE MADE THROUGH THE REGISTERED MEMBER WEBSITE |
| 00001 | 6 AND MORE | A 10% DISCOUNT IS APPLIED TO A PURCHASE MADE THROUGH THE REGISTERED MEMBER WEBSITE |

…

SERVER APPARATUS AND PRIVILEGE RECEIVING OPPORTUNITY NOTIFICATION METHOD

CROSS-REFERENCE TO RELATED APPLICATIONS

This application is based upon and claims the benefit of priority of the prior Japanese Patent Application No. 2012-075193, filed on Mar. 28, 2012, the entire contents of which are incorporated herein by reference.

FIELD

The embodiments discussed herein are related to a server apparatus, a privilege receiving, and a privilege receiving opportunity notification method.

BACKGROUND

Conventionally, an information provision method called "recommendation" has been in use. Through the recommendation, items and privileges that have high levels of relevance to an item being browsed by a user and items bought by the user are introduced. For example, when the user has accessed and browsed a certain item, information such as "Those who purchased this item also purchased the following items: . . . " is introduced to the user.

For another example of the recommendation, a registered member website affiliated with a shopping mall website is explained also. A user registered for this membership website is allowed to access the shopping mall website directly and not through the membership website. However, when using a service from the shopping mall website after having accessed this website through the membership website, the user is granted an opportunity to receive a privilege corresponding to the usage history of the user.

For example, when a user registered for the membership website has accessed the membership website, information such as "the shopping mall website A is selling the item B at 3% discount" is introduced to the user. Then, accessing the shopping mall website A through this information enables the user to receive a privilege to buy the item B at a 3% discount price. Further, in a case where the user has ever used the shopping mall website A through the membership website, information on a higher discount rate for the item B is introduced to the user, for example.

Patent Document 1: Japanese Laid-open Patent Publication No. 2002-041455

Patent Document 2: Japanese Laid-open Patent Publication No. 2011-060022

However, one problem with the above-described related technique has been that the user might miss an opportunity to receive a privilege.

Specifically, even in case of a user registered for the membership website, information such as "the shopping mall website A is selling the item B at 3% discount" is not introduced to the user when the user has accessed the shopping mall website A directly and not through the membership website. Further, this user has had no chance to know that having visited the website A through the membership website would have provided the user with an opportunity to receive a privilege.

SUMMARY

According to an aspect of an embodiment, a server apparatus includes a memory that stores location information that identifies a second website from which a privilege is granted when the second website is used after having been accessed through a first website; and a processor coupled to the memory. The processor executes acquiring location information that identifies a site accessed by a user. The processor executes first determining whether the location information acquired at the acquiring includes information that is identical to location information that identifies the first website. The processor executes second determining, when it is determined that the information identical to the location information of the first website is not included therein, whether location information of the second website is stored in the memory, the location information being identical to the location information acquired at the acquiring. The processor executes when the identical location information is determined to be stored in the memory, generating appeal information with which to appeal for accessing the second website through the first website, and notifying the user of the appeal information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating the configuration of an information provision system according to a first embodiment;

FIG. 2 is a diagram illustrating one example of information stored in a registration information table;

FIG. 3 is a diagram illustrating one example of information stored in an access log table;

FIG. 4 is a diagram illustrating one example of information stored in a privilege usage number table;

FIG. 5 is a diagram illustrating one example of information stored in a privilege DB;

FIG. 6 is a diagram illustrating one example of information stored in an appeal announcement table;

DESCRIPTION OF EMBODIMENTS

Figure 7:
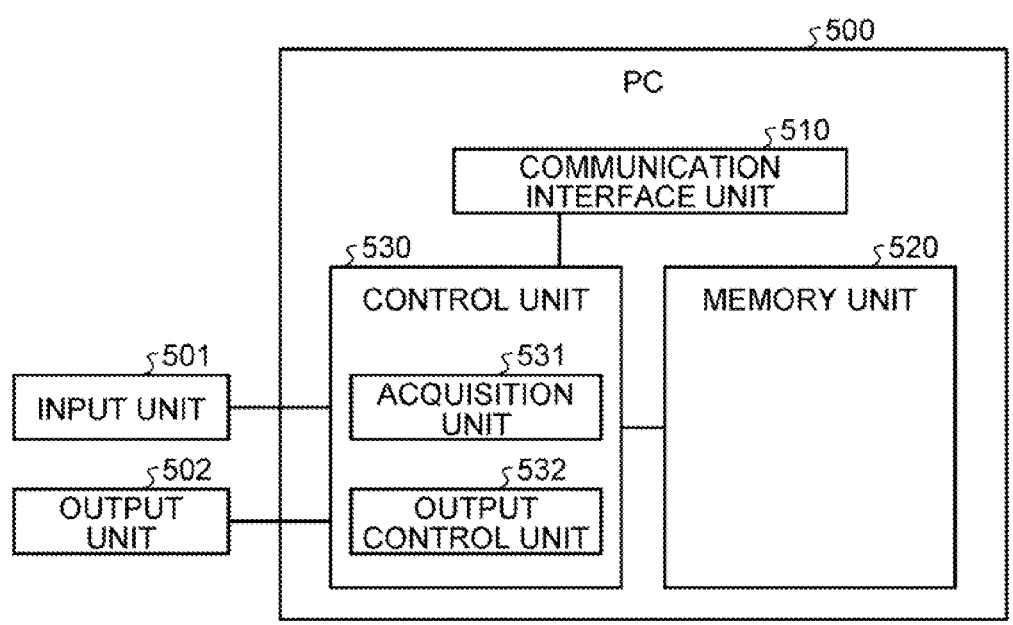
FIG. 7 is a block diagram illustrating the functional configuration of a PC according to the first embodiment.

Preferred embodiments of the present invention will be explained with reference to accompanying drawings. Note that these embodiments do not limit the present invention. In addition, any combination of some or all of the embodiments is applicable as long as processing from the embodiments is executed without causing any conflicts in the executed processing.

[a] First Embodiment

A first embodiment describes a Web server as one example of the server apparatus. This Web server provides a registered member website affiliated with a shopping mall website. A user registered for this membership website is allowed to directly access the shopping mall website without visiting the membership website. However, when using a service from the shopping mall website after having arrived there through this membership website, the user is granted an opportunity to receive a privilege. Note that the first embodiment describes an information provision system including a Web server, and a PC that connects to this Web server and acquires various kinds of information therefrom.

Configuration of the Information Provision System

FIG. 1 is a block diagram illustrating the configuration of the information provision system according to the first embodiment. As illustrated in FIG. 1, an information provision system 100 includes a customer information DB (Data Base) 200, a privilege DB 300, an appeal announcement DB 400, a PC (Personal Computer) 500, and a Web server 600.

The PC 500 and the Web server 600 are connected to each other via a network 110 so as to be able to communicate with each other. Additionally, the Web server 600 connects to the customer information DB 200, the privilege DB 300, and the appeal announcement DB 400. Further, the PC 500 and the Web server 600 connect to other servers and the like, which are not illustrated, via the network. Note that these other servers include a server that provides the shopping mall website affiliated with the registered member website. Additionally, the number of PCs included in the information provision system 100 is not limited by the drawings and may be changed.

The customer information DB 200 stores various information on registered members of the registered member website. Note that information that the customer information DB 200 stores is described later using FIGS. 2 to 4. The privilege DB 300 stores information on privileges that the registered member website offers to the registered members. Note that information that the privilege DB 300 stores is described later using FIG. 5. The appeal announcement DB 400 stores phrases used for appealing to the registered members to go through the registered member website. Note that information that the appeal announcement DB 400 stores is described later using FIG. 6.

The PC 500 is an information processing apparatus that, upon accepting an operation from a user thereof, requests the Web server 600, another server or the like to provide various information. For example, with an Internet browser 500a started up on the PC 500, upon accepting an operation from the user, the PC 500 requests the Web server 600 or another server to provide various kinds of information. Note that the following description assumes the user of the PC 500 to be a registered member of the registered member website.

The Web server 600 is a server that provides the registered member website. Upon accepting access to the registered member website from the PC 500, the Web server 600 provides various kinds of information. For example, the Web server 600 lists those selected from privileges stored in the privilege DB 300, and provides the listed privileges to the user.

In one example, the Web server 600 introduces to the user privileges such as "A 3% discount is applied to the item B at the shopping mall website A". Note that the privileges such as "A 3% discount is applied to the item B at the shopping mall website A" is not introduced to the user when the user has accessed the shopping mall website directly and not through the registered member website. The Web server 600 executes, by using known techniques, processing of listing these privileges to be introduced. In addition, any website, such as the shopping mall website A, such that access thereto through the Web server 600 results in introduction of privileges is referred to as a "privilege-granting website".

Further, the Web server 600 acquires a website URL (Uniform Resource Locator) accessed by the user. Then, the Web server 600 determines whether the acquired website URL includes information that is identical to the website URL of the registered member website. Subsequently, upon determining that information identical to the website URL of the registered member website is not included, the Web server 600 determines whether a website URL, of any one of the privilege-granting websites, that is identical to the acquired website URL is stored in the privilege DB 300. Then, upon determining that a website URL of any privilege-granting website is stored in the privilege DB 300, the Web server 600 generates appeal information with which to appeal for accessing the privilege-granting website through the registered member website. The Web server 600 is thus capable of preventing the user from missing opportunities to receive privileges. Note that, in the following description, processing in which the Web server 600 generates the appeal information and notifies the user of the appeal information is referred to as appeal announcement processing.

Customer Information DB

Next, information that the customer information DB 200 stores is described using FIGS. 2 to 4. The customer information DB 200 includes a registration information table 201, an access log table 202, and a privilege usage count table 203 as tables that store various kinds of information on the user of the PC 500 who is a registered member of the registered member website. Note that, in the following description, the user of the PC 500 is referred to simply as "the user".

Registration Information Table 201

The registration information table 201 stores registration information that includes attributes of the user. Information that the registration information table 201 stores is described using FIG. 2. FIG. 2 is a diagram illustrating one example of information stored in the registration information table 201. Note that FIG. 2 is the registration information table 201 corresponding to a user identified with a user ID (Identifier) "xxx1". Additionally, although FIG. 2 illustrates registration information identified with the user ID "xxx1" as an example, the registration information table 201 may store registration information corresponding to other registered members.

As illustrated in FIG. 2, the registration information table 201 stores "User ID, Name, Address, Telephone Number, Model Type Name of Owned Machine, Machine Number of Owned Machine, Age Range, Gender, Occupation, Bank Account Number, Credit Card Number, Model Type Name of Currently Operated Machine, and Machine Number of Currently Operated Machine".

Here, "User ID" stored in the registration information table 201 indicates an identifier for the user. For example, "xxx1" or the like is stored in "User ID". Further, "Name" stored in the registration information table 201 indicates the name of the user. For example, "XXX (family name), YYY (given name)" or the like is stored in "Name".

Further, "Address" stored in the registration information table 201 indicates the place of residence of the user. For example, "X prefecture, Y city, . . . " or the like is stored in "Address". Further, "Telephone Number" stored in the registration information table 201 indicates the telephone number of the user. For example, "03-xxxx-xxxx" or the like is stored in "Telephone Number".

Further, "Model Type Name of Owned Machine" stored in the registration information table 201 indicates the model type name of a PC owned by the user. For example, "a123456789" or the like is stored in "Model Type Name of Owned Machine". Further, "Machine Number of Owned Machine" stored in the registration information table 201 indicates an identifier for the PC owned by the user. For example, "aaabbbccc" or the like is stored in "Machine Number of Owned Machine".

Further, "Age Range" stored in the registration information table 201 indicates an age range within which the user falls. For example, "40 to 49", which indicates that the user is in his or her forties, is stored in "Age Range". Further, "Gender" stored in the registration information table 201 indicates the gender of the user. For example, "male" or "female" is stored in "Gender".

Further, "Occupation" stored in the registration information table 201 indicates the occupation in which the user is engaged. For example, "company employee" or the like is stored in "Occupation". Further, "Bank Account Number" stored in the registration information table 201 indicates a bank account number specified by the user. For example, "0abcdef" or the like is stored in "Bank Account Number". Further, "Credit Card Number" stored in the registration information table 201 indicates a credit card number owned by the user. For example, "abcd-xxxx-xxxx-xxxx" or the like is stored in "Credit Card Number".

Further, "Model Type Name of Currently Operated Machine" stored in the registration information table 201 indicates the model type name of a PC or the like that is currently being operated by the user. For example, "a123456789" or the like is stored in "Model Type Name of Currently Operated Machine". Note that FIG. 2 indicates that a PC currently being operated by the user is of the same model type as the PC with respect to which "Model Type Name of Owned Machine" is registered. Further, "Machine Number of Currently Operated Machine" stored in the registration information table 201 indicates an identifier for a PC or the like that is currently being operated by the user. For example, "aaabbbccc" or the like is stored in "Machine Number of Currently Operated Machine". Note that FIG. 2 indicates that a PC currently being operated by the user is the same machine as the PC with respect to which "Machine Number of Owned Machine" is registered.

Note that information that the registration information table 201 stores is not limited by the drawings. For example, the registration information table 201 may be configured to additionally store "Place of Work", "Marital Status" and the like as the registration information. Alternatively, the registration information table 201 may be configured to store only "User ID, Name, Address, Telephone Number, Model Type Name of Owned Machine, Machine Number of Owned Machine, Age Range, Gender, Bank Account Number, and Credit Card Number".

Access Log Table 202

The access log table 202 stores privileges and website URLs accessed by the user, while associating the privileges and website URLs with the dates and times of the access. Information that the access log table 202 stores is described using FIG. 3. FIG. 3 is a diagram illustrating one example of information stored in the access-log table 202.

As illustrated in FIG. 3, the access log table 202 stores information in which "User ID", "Access Date and Time", "Privilege Discrimination ID" and "Website URL" are associated with one another. Here, "User ID" stored in the access log table 202 indicates the same as "User ID" stored in the registration information table 201.

Further, "Access Date and Time" stored in the access log table 202 indicates dates and times when the user accesses the privileges and website URLs. For example, "2012/01/25/21/33", which indicates that a corresponding one of the privilege and website URLs was accessed at 21:33 on Jan. 25, 2012, or the like is stored in "Access Date and Time".

Further, "Privilege Discrimination ID" stored in the access log table 202 indicates identifiers for the privileges accessed by the user. For example, "00001" or the like is stored in "Privilege Discrimination ID". Further, "Website URL" stored in the access log table 202 indicates location information that identifies websites accessed by the user. For example, "http://aaaa.bbbb.ccc.co.jp/index.html" or the like is stored in "Website URL".

In one example, the access log table 202 illustrated in FIG. 3 indicates that the user "xxx1" accessed a privilege "00001" at 21:33 on Jan. 25, 2012. Likewise, this table indicates that the user "xxx1" accessed a website "http://aaaa.bbbb.cc.co.jp/index.html" at 22:08 on Jan. 25, 2012.

Privilege Usage Count Table 203

The privilege usage count table 203 stores privileges used by the user, while associating the privileges with the numbers of times that the user has used the respective privileges. Information that the privilege usage count table 203 stores is described using FIG. 4. FIG. 4 is a diagram illustrating one example of information stored in the privilege usage count table 203.

As illustrated in FIG. 4, the privilege usage count table 203 stores information in which "User ID", "Privilege Discrimination ID", and "Usage Count" are associated with each other. Here, "User ID" stored in the privilege usage count table 203 indicates the same as "User ID" stored in the registration information table 201. Also, "Privilege Discrimination ID" stored in the privilege usage count table 203 indicates the same as "Privilege Discrimination ID" stored in the access log table 202.

Further, "Usage Count" stored in the privilege usage count table 203 indicates the numbers of times that the respective privileges is used. For example, "2", which indicates that a corresponding one of the privileges is used twice, or the like is stored in "Usage Count". In one example, the privilege usage count table 203 illustrated in FIG. 3 indicates that the user "xxx1" has used the privilege "00001" twice so far.

Privilege DB 300

The privilege DB 300 stores website URLs of privilege granting websites from which privileges are granted when being used after having been accessed through the registered member website. Information that the privilege DB 300 stores is described using FIG. 5. FIG. 5 is a diagram illustrating one example of information stored in the privilege DB 300. Note that the FIG. 5 illustrates the privilege DB 300 with respect to a privilege identified with a privilege discrimination ID "00001". Additionally, although FIG. 5 illustrates as an example the privilege identified with the privilege discrimination ID "00001", information with respect to a privilege identified with another privilege discrimination ID may be stored in the privilege DB 300.

As illustrated in FIG. 5, the privilege DB 300 stores "Privilege Discrimination ID, Privilege Offering Company Name, Website Name, Website URL, and Privilege Expiration Date".

Here, "Privilege Discrimination ID" stored in the privilege DB 300 indicates an identifier for a privilege to be offered to the user. For example, "00001" or the like is stored in "Privilege Discrimination ID". Further, "Privilege Offering Company Name" stored in the privilege DB 300 indicates the name of a company that offers the privilege. For example, "aaa Co., Ltd." or the like is stored in "Privilege Offering Company Name".

Here, "Website Name" stored in the privilege DB 300 indicates a name assigned to a website operated by the company that offers the privilege. For example, "aaa store" or the like is stored in "Website Name". Further, "Website URL" stored in the privilege DB 300 indicates an URL original to a website from which the privilege is offered. In other words, "Website URL" indicates the website URL of a privilege granting website. For example, "http://aaaa.bbbb.ccc.co.jp/index.html" or the like is stored in "Website URL". Further, "Privilege Expiration Date" stored in the privilege DB 300 indicates the expiration date of the privilege. For example, "2012/12/31", which indicates that the privilege is to expire on Dec. 31, 2012, or the like is stored in "Privilege Expiration Date".

In one example, the privilege DB 300 illustrated in FIG. 5 indicates that the website URL of "aaa Store" operated by "aaa Co., Ltd." is "http://aaaa.bbbb.ccc.co.jp/index.html", and that the privilege "00001" to expire on Dec. 31, 2012 is being offered therefrom.

Appeal Announcement DB 400

Next, information that the appeal announcement DB 400 stores is described using FIG. 6. FIG. 6 is a diagram illustrating one example of information stored in the appeal announcement DB 400. Note that the FIG. 6 illustrates the appeal announcement DB 400 with respect to a privilege identified with a privilege discrimination ID "00001". Additionally, although FIG. 6 illustrates as an example the privilege identified with the privilege discrimination ID "00001", information with respect to a privilege identified with another privilege discrimination ID may be stored in the appeal announcement DB 400.

As illustrated in FIG. 6, the appeal announcement DB 400 stores information in which "Privilege Discrimination ID", "Usage Count", and "Appeal Phrase" are associated with each other. Here, "Privilege Discrimination ID" stored in the appeal announcement DB 400 indicates the same as "Privilege Discrimination ID" stored in the privilege DB 300. Further, "Usage Count" stored in the appeal announcement DB 400 indicates the numbers of times that the privilege is used. For example, "0", which indicates that the privilege is not used, "1 to 5", which indicates that the privilege is used one to five times so far, and "6 or more", which indicates that the privilege is used six times or more so far, or the like, are stored in "Usage Count".

"Appeal Phrase" stored in the appeal announcement DB 400 indicates phrases that appeal to the user to go through the registered member website. For example, "A privilege is granted on a purchase made through the registered member website" or the like is stored in "Appeal Phrase". Note that different appeal phrases are stored in "Appeal Phrase" in one-to-one correspondence with different numbers of times that the privilege is used.

In one example, the appeal announcement DB 400 illustrated in FIG. 6 indicates that an appeal is made with "A privilege is granted on a purchase made through the registered member website" in a case where the privilege "00001" is not used by the user. Further, the appeal announcement DB 400 illustrated in FIG. 6 indicates that an appeal is made with "A 5% discount is applied to a purchase made through the registered member website" in a case where the privilege "00001" is used one to five times so far by the user. Further, the appeal announcement DB 400 illustrated in FIG. 6 indicates that an appeal is made with "A 10% discount is applied to a purchase made through the registered member website" in a case where the privilege "00001" is used six times or more so far by the user.

Note that, although the above description illustrates the appeal announcement DB 400 as one that stores appeal phrases to be switched depending on the usage count, the appeal announcement DB 400 is not limit to this. For example, the appeal announcement DB 400 may store a predetermined appeal phrase independently of the usage counts.

Configuration of PC

Next, the functional configuration of the PC 500 according to the first embodiment is described using FIG. 7. FIG. 7 is a block diagram illustrating the function configuration of the PC 500 according to the first embodiment. As illustrated in FIG. 7, the PC 500 according to the first embodiment includes an input unit 501, an output unit 502, a communication interface unit 510, a memory unit 520, and a control unit 530.

The input unit 501 is, for example, a keyboard or a touch panel, and accepts various input operations from the user. The output unit 502 is, for example, is a monitor or a speaker, and outputs various kinds of information to the user. The communication interface unit 510 is connected to the Web server 600 via the network, and controls information exchange with the Web server 600. The memory unit 520 is, for example, a semiconductor memory device such as RAM (Random Access Memory), and stores various programs to be executed in the control unit 530.

The control unit 530 is an electronic circuit such as a CPU (Central Processing Unit) or an MPU (Micro Processing Unit), and executes various kinds of arithmetic processing. Further, the control unit 530 includes an acquisition unit 531 and an output control unit 532.

The acquisition unit 531 acquires a website URL accepted from the user via the input unit 501, and transmits the acquired website URL to the Web server 600.

The output control unit 532 outputs, to the output unit 502, various kinds of information accepted from the Web server 600. For example, the output control unit 532 causes the output unit 502 to display, as images, various kinds of information accepted from the Web server 600. Note that the output control unit 532 may cause the output unit 502 to output, as voice, various kinds of information accepted from the Web server 600.

Configuration of Web Server

Figure 8:
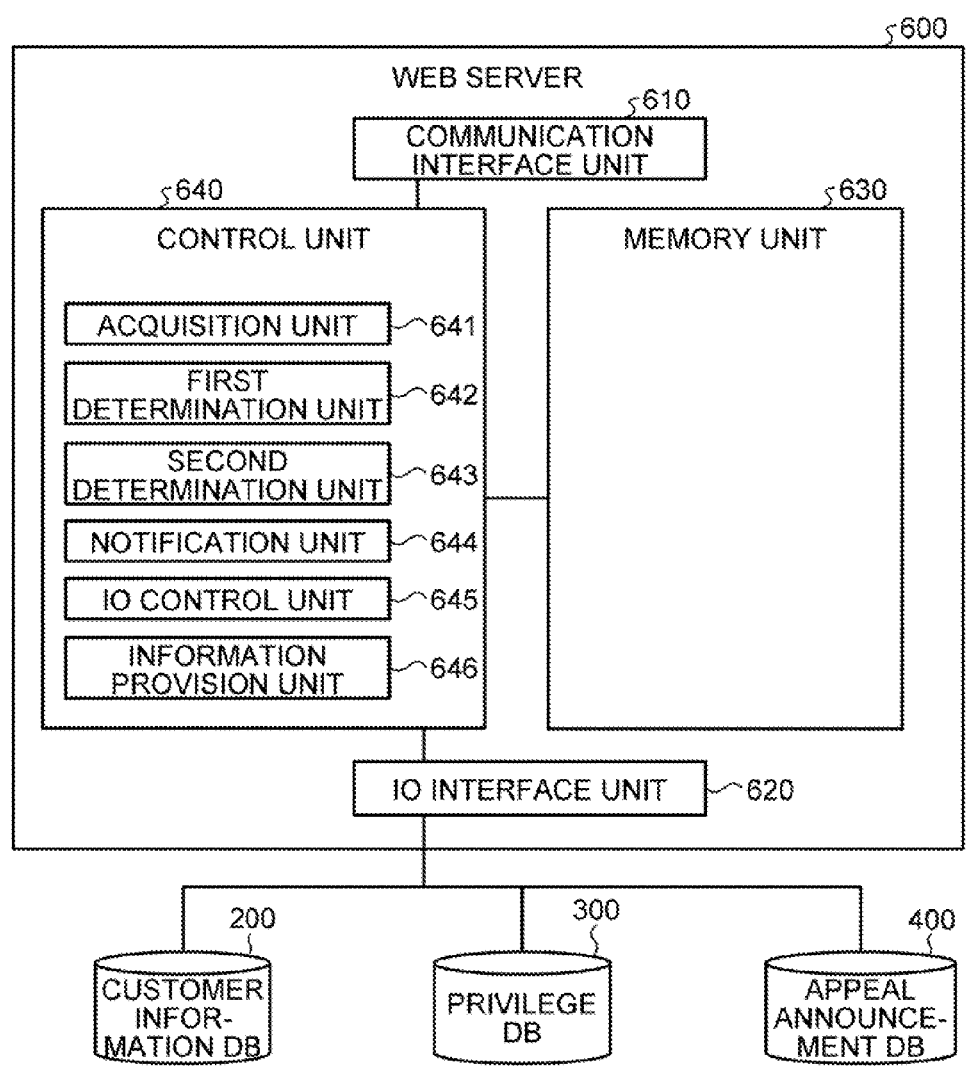
FIG. 8 is a block diagram illustrating the functional configuration of a Web server according to the first embodiment.

Next, the functional configuration of the Web server 600 according to the first embodiment is described using FIG. 8. FIG. 8 is a block diagram illustrating the functional configuration of the Web server 600 according to the first embodiment. As illustrated in FIG. 8, the Web server 600 according to the first embodiment includes a communication interface unit 610, an IO (Input/Output) interface unit 620, a memory unit 630, and a control unit 640. Further, the Web server 600 connects to the customer information DB 200, the privilege DB 300 and the appeal announcement DB 400.

The communication interface unit 610 connects to the PC 500 via the network, and controls information exchange with the PC 500. The IO interface unit 620 controls information exchange with the customer information DB 200, the privilege DB 300 and the appeal announcement DB 400.

The memory unit 630 is, for example, a semiconductor memory device such as RAM (Random Access Memory), and stores various programs to be executed in the control unit 640. Further, the memory unit 630 temporarily stores information that is read from the customer information DB 200, the privilege DB 300 or the appeal announcement DB 400.

The control unit 640 is an electronic circuit such as a CPU or an MPU, and includes an acquisition unit 641, a first determination unit 642, a second determination unit 643, a notification unit 644, an IO control unit 645, and an information provision unit 646.

The acquisition unit 641 acquires a website URL that the user has accessed from the PC 500. Then, the acquisition unit 641 outputs the acquired website URL to the first determination unit 642.

The first determination unit 642 determines whether the website URL acquired by the acquisition unit 641 includes information that is identical to the URL of the registered member website. For example, upon determining that the website URL acquired by the acquisition unit 641 includes information identical to the URL of the registered member website, the first determination unit 642 ends processing without executing the appeal announcement processing. On the other hand, upon determining that the website URL acquired by the acquisition unit 641 includes no information identical to the URL of the registered member website, the first determination unit 642 notifies the second determination unit 643 that the acquired website URL includes no information identical to the URL of the registered member website. Note that determination processing to be executed by the first determination unit 642 is later described using FIG. 9.

When the first determination unit 642 has determined that the website URL acquired by the acquisition unit 641 includes no information identical to the URL of the registered member website, the second determination unit 643 determines whether a URL, of any privilege-granting website, that is identical to the URL acquired by the acquisition unit 641 is stored in the privilege DB 300.

For example, upon determining that no URL of any privilege-granting website that is identical to the website URL acquired by the acquisition unit 641 is stored in the privilege DB 300, the second determination unit 643 ends processing without executing the appeal announcement processing. On the other hand, upon determining that a URL of any privilege-granting website that is identical to the website URL acquired by the acquisition unit 641 is stored in the privilege DB 300, the second determination unit 643 acquires, from the privilege DB 300, one of the privilege discrimination IDs that corresponds to the URL of the privilege-granting website. Then, the second determination unit 643 notifies the notification unit 644 of the acquired privilege discrimination ID.

Upon being notified of the privilege discrimination ID by the second determination unit 643, the notification unit 644 generates appeal information with which to appeal to the user to access the privilege-granting website through the registration-base membership website, and then notifies the user of the appeal information.

For example, the notification unit 644 reads, from the privilege usage count table 203, one of the appeal phrases that has a content corresponding to the number of times that the user has used the privilege-granting website. Then, the notification unit 644 generates the appeal information from the appeal phrase thus read. For example, in a case where the appeal announcement DB 400 illustrated in FIG. 6 is used, when the number of times that the user has used a privilege identified with "00001" is zero, the notification unit 644 generates "A privilege is granted on a purchase made through the registered member website" as the appeal information.

The IO control unit 645 reads information stored in the customer information DB 200, the privilege DB 300, and the appeal announcement DB 400 via the IO interface unit 620, and stores the information in the memory unit 630. Further, the IO control unit 645 writes information stored in the memory unit 630 into the customer information DB 200, the privilege DB 300, and the appeal announcement DB 400 via the IO interface unit 620.

Upon accepting from the user, via the PC 500, access to the registered member website, the information provision unit 646 lists privileges to be offered to the user. For example, based on the access log table 202 and the privilege usage count table 203 with respect to the user, the information provision unit 646 selects, out of the privilege discrimination IDs, privilege discrimination IDs that are likely to be accessed by the user, and then lists the selected privilege discrimination IDs. The information provision unit 646 transmits the thus listed privilege discrimination IDs to the PC 500. Note that processing that the information provision unit 646 executes to list privileges is not limited to this, and may be executed through known techniques.

Then, the information provision unit 646 accepts a privilege discrimination ID requested from the user out of the listed privilege discrimination IDs thus transmitted, and then transmits to the PC 500 a website URL that corresponds to the thus accepted privilege discrimination ID.

Further, when the user has accessed any website or any privilege, the information provision unit 646 stores "User ID", "Access Date and Time", "Privilege Discrimination ID", and "Website URL" in the access log table 202 while associating these items with one another.

Further, when the user has used any privilege, the information provision unit 646 stores "User ID", "Privilege Discrimination ID", and "Usage Count" in the privilege usage count table 203 while associating these items with one another.

Determination Processing by First Determination Unit 642

Figure 9:
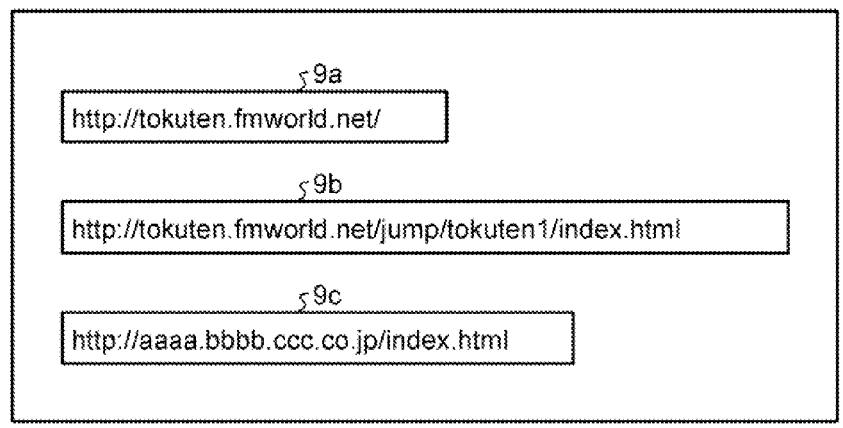
FIG. 9 is a diagram illustrating one example of determination processing to be executed by a first determination unit.

The determination processing to be executed by the first determination unit 642 is described using FIG. 9. FIG. 9 is a diagram illustrating one example of the determination processing to be executed by the first determination unit 642. In FIG. 9, reference sign 9a designates the website URL of the registered member website, reference sign 9b designates a website URL acquired by the acquisition unit 641 when the user has arrived through the registration-base membership website, and reference sign 9c designates a website URL acquired by the acquisition unit 641 when the user has not arrived through the registered member website.

For example, when a website URL acquired by the acquisition unit 641 is the website URL designated by reference sign 9b, the first determination unit 642 determines that the website URL acquired by the acquisition unit 641 is partially identical to the website URL designated by reference sign 9a. Specifically, the website URLs designated by reference signs 9a and 9b are partially identical to each other by both having "http://tokuten.fmworld.net/". In this case, the first determination unit 642 determines that information identical to the URL of the registration-base membership website is included.

Further, for example, when the website URL acquired by the acquisition unit 641 is the website URL designated by reference sign 9c, the first determination unit 642 determines that the website URL acquired by the acquisition unit 641 is not partially identical to the website URL designated by reference sign 9a. In this case, the first determination unit 642 determines that information identical to the URL of the registered member website is not included.

Appeal Information Generated by Notification Unit 644

Figure 10:
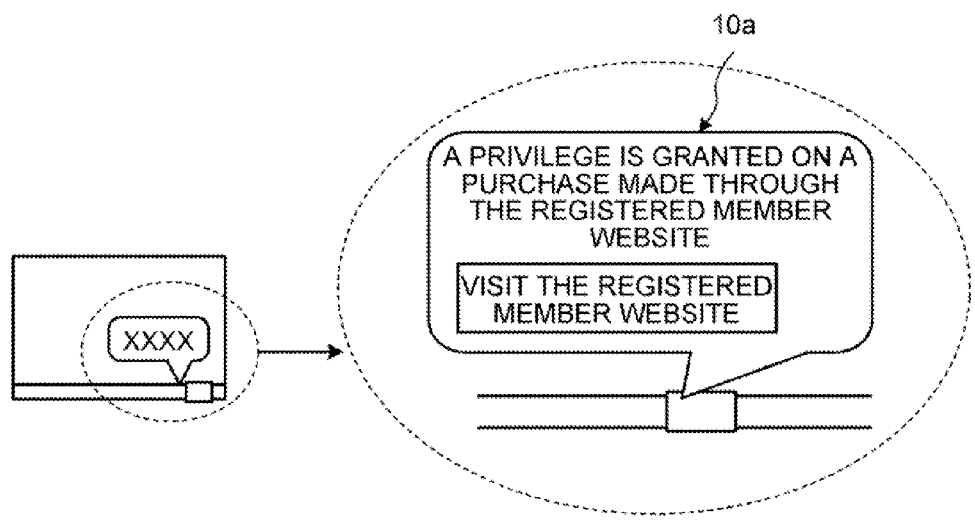
FIG. 10 is a diagram illustrating one example of appeal information generated by a notification unit.

Next, one example of the appeal information generated by the notification unit 644 is described using FIG. 10. FIG. 10 is a diagram illustrating one example of the appeal information generated by the notification unit 644. As illustrated in FIG. 10, when an appeal phrase generated by the notification unit 644 is transmitted to the PC 500, "A privilege is granted on a purchase made through the registered member website" is displayed on the output unit 502 of the PC 500.

Figure 11:
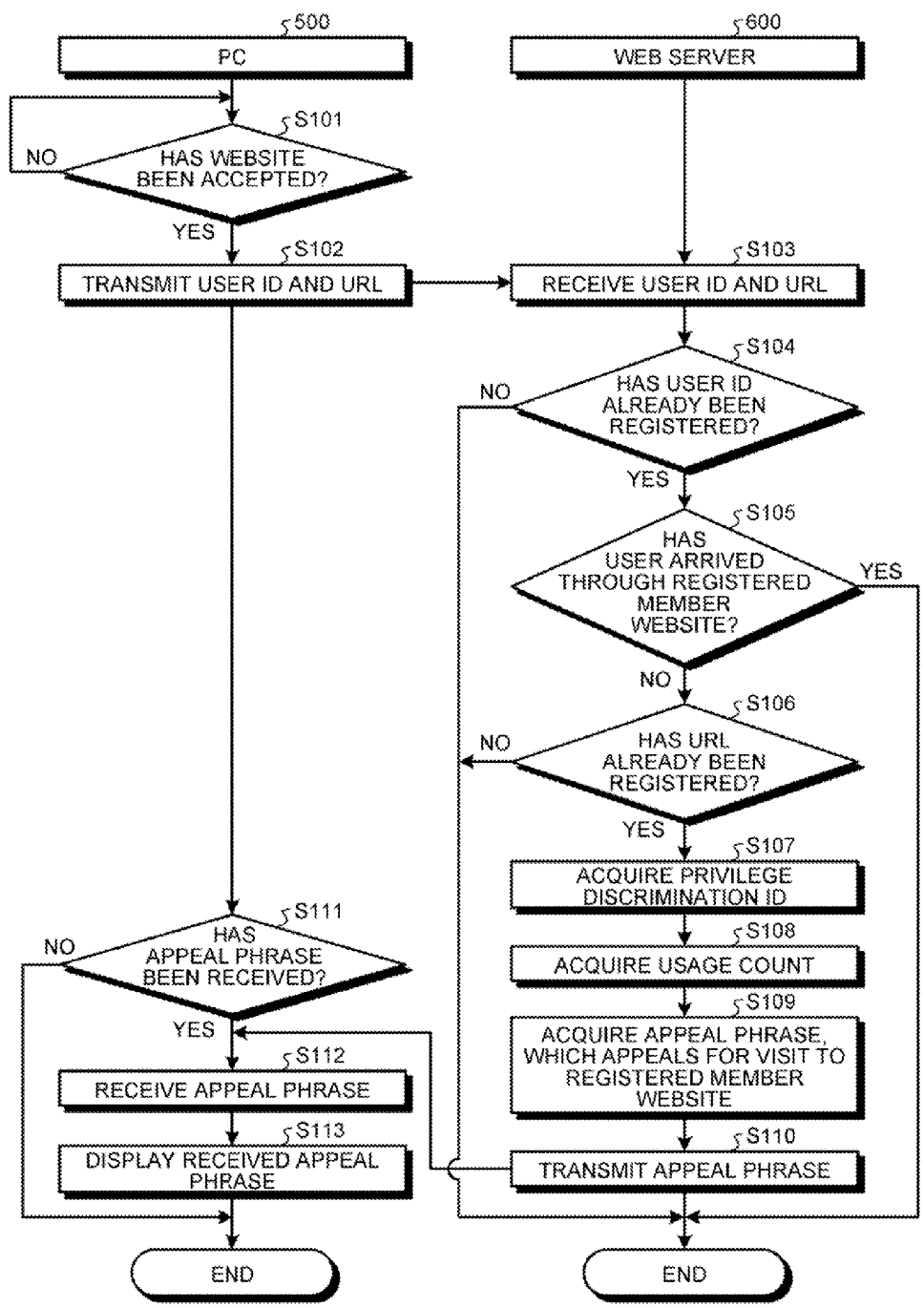
FIG. 11 is a flowchart illustrating a procedure for appeal announcement processing to be executed by the information provision system according to the first embodiment.

Procedure for Processing to be Executed by Information Provision System According to the First Embodiment A procedure for the appeal announcement processing to be executed by the information provision system according to the first embodiment is described using FIG. 11. FIG. 11 is a flowchart illustrating the procedure of the appeal announcement processing to be executed by the information provision system according to the first embodiment.

As illustrated in FIG. 11, in the PC 500, the acquisition unit 531 determines whether input of a website URL is accepted from the user (step S101). Here, upon determining that input of a website URL is accepted from the user (step S101: Yes), the acquisition unit 531 transmits the user ID and the website URL to the Web server 600 (step S102).

In the Web server 600, the acquisition unit 641 receives the user ID and the website URL from the PC 500 (step S103). Then, the first determination unit 642 determines whether the user ID is registered in the registration information table 201 (step S104). Here, upon determining that the user ID is not registered in the registration information table 201 (step S104: No), the first determination unit 642 ends processing.

On the other hand, upon determining that the user ID is registered in the registration information table 201 (step S104: Yes), the first determination unit 642 determines whether the user has gone through the registered member website to arrive at the website URL (step S105). Upon determining that the user has gone through the registered member website (step S105: Yes), the first determination unit 642 ends processing.

Further, when the first determination unit 642 has determined that the user has not gone through the registered member website (step S105: No), the second determination unit 643 determines whether the website URL is registered (step S106). Here, upon determining that the website URL is not registered yet (step S106: No), the second determination unit 643 ends processing.

On the other hand, upon determining that the website URL is registered (step S106: Yes), the second determination unit 643 acquires, from the privilege DB 300, a privilege discrimination ID that corresponds to the website URL (step S107).

Then, the notification unit 644 acquires, from privilege usage count table 203, the number of times of usage that corresponds to the user ID and the privilege discrimination ID (step S108). Then, the notification unit 644 acquires, from the appeal announcement DB 400, an appeal phrase that corresponds to the privilege discrimination ID and to the acquired number of times of usage (step S109). Subsequently, the notification unit 644 transmits the acquired appeal phrase to the PC 500 (step S110).

In the PC 500, the output control unit 532 determines whether an appeal phrase is received from the Web server 600 (step S111). Here, upon determining that no appeal phrase is received from the Web server 600, the output control unit 532 ends processing (step S111: No). Further, upon determining that an appeal phrase is received from the Web server 600 (step S111: Yes), the output control unit 532 receives the appeal phrase (step S112). Then, the output control unit 532 causes the output unit 502 to display the received appeal phrase (step S113).

Effects of the First Embodiment

As described above, upon determining based on the acquired website URL that the user has directly accessed a privilege-granting website, the Web server 600 according to the first embodiment notifies that access thereto through the registered member website results in grant of a privilege. As a result, the Web server 600 according to the first embodiment is capable of preventing the user from missing opportunities to receive privileges.

Further, the Web server 600 according to the first embodiment makes it possible that a service business entity operating a privilege-granting website eliminates missed opportunities for the website to be accessed by the user, thereby enabling further accumulation of access history data of the user. As a result, the service business entity is enabled to improve accuracy in introducing services. Additionally, the increased number of accesses to the website from members enables the service business entity to develop a media business using websites for advertising and the like.

[b] Second Embodiment

Incidentally, the server apparatus disclosed in this application may be implemented in various different modes other than the above-described embodiment. For this reason, another embodiment of the server apparatus disclosed in this application is described as a second Embodiment.

System Configuration and the Like

All or part of processing, out of the processing described in this embodiment, that is described as processing to be automatically executed may be executed manually. Likewise, all or part of processing that is described as processing to be manually executed may be automatically executed using known techniques. Besides, the processing procedures, the control procedures, and the specific names, which are represented in the above description and the drawings, may be freely changed unless otherwise specified.

Additionally, the respective constituent units illustrated in the drawings are conceptual based on the functions, and do not necessarily need to be physically configured exactly as illustrated. For example, the Web server 600 may have the first determination unit 642 and the second determination unit 643 integrated with each other. Further, all or any part of the processing functions that the respective units carry out may be implemented by a CPU or a program that the CPU analyzes and executes, or be implemented in the form of hardware using wired logics.

Program

Incidentally, the various kinds of processing described in the above embodiment may be implemented by executing a previously prepared program on a computer system such as a personal computer or a work station. For this reason, one example of a computer that executes a program having the same functions as the above embodiment is described below.

Figure 12:
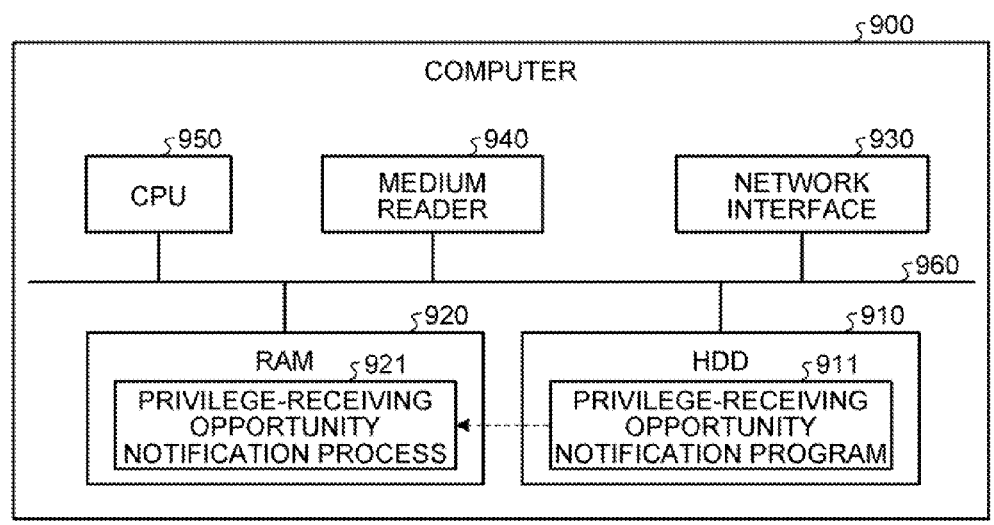
FIG. 12 is a diagram illustrating one example of a computer that executes a privilege receiving opportunity notification program.

FIG. 12 is a diagram illustrating one example of a computer 900 that executes a privilege receiving opportunity notification program. As illustrated in FIG. 12, the computer 900 includes: an HDD (Hard Disk Drive) 910; a RAM 920; a network interface 930 that transmits and receives data to and from other apparatuses; a medium reader 940; and a CPU 950. In addition, the respective devices 910 to 950 are connected to a bus 960.

Here, as illustrated in FIG. 12, the HDD 910 previously stores a privilege receiving opportunity notification program 911 configured to carry out the same functions as those carried out by the acquisition unit 641, the first determination unit 642, the second determination unit 643 and the notification unit 644, which are illustrated in FIG. 8. Further, the medium reader 940 stores various data that is used for putting the privilege receiving opportunity notification program 911 into operation. In addition, the CPU 950 reads the privilege receiving opportunity notification program 911 from the HDD 910, and executes the program as a privilege receiving opportunity notification process 921. That is, the privilege receiving opportunity notification process 921 executes the same operations as those executed by the acquisition unit 641, the first determination unit 642, the second determination unit 643 and the notification unit 644, which are illustrated in FIG. 8.

Incidentally, the above-mentioned privilege receiving opportunity notification program 911 does not necessarily need to be stored in the HDD 910. For example, the program may be stored in a "portable physical medium", such as a flexible disk (FD), a CD-ROM, an MO disc, a DVD disc, a magneto-optical disc, an IC card or the like that is inserted into the computer 900. Further, the program may be stored in a "fixed physical medium", such as a hard disk drive (HDD) provided internal or external to the computer 900. Further, the program may be stored in "another computer system" that is connected to the computer 900 via a public line, the Internet, a LAN (Local Area Network), a WAN (Wide Area Network) or the like. The computer 900 may be configured to later execute the program after reading the program from any one of these media and the system.

That is, this program is configured to be stored, in a computer-readable form, in a recording medium such as the above-mentioned "portable physical medium", "fixed physical medium" or "communication medium". Then, the computer 900 reads the program from such a recording medium and executes the program, thereby implementing the same functions as those implemented by the above-described embodiment. Note that what is called a program in this embodiment is not limited to a program to be executed by the computer 900. For example, the present invention may be applied similarly to cases where another computer system or a server executes the program, and where another computer system and a server cooperate to execute the program.

The server apparatus, the privilege receiving opportunity notification program, and the privilege receiving opportunity notification method that are disclosed in the present application produce an effect of preventing users from missing opportunities to receive privileges.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server apparatus comprises:
a memory; and
a processor coupled to the memory, wherein the processor executes a process comprising:
providing a registered member website where a list of privileges a registered member can obtain at a privilege-granting website is displayed;
acquiring location information that identifies a site accessed by a user;
first determining whether the acquired location information is identical to location information of the registered member website;
second determining, when it is determined that the acquired location information is not identical to the location information of the registered member website, whether the acquired location information is identical to location information of the privilege-granting website; and
when the acquired location information is identical to the location information of the privilege-granting website generating information which prompts the user to access the registered member website before accessing the privilege-granting website in order to acquire a privilege, and notifying the user of the generated information.

2. The server apparatus according to claim 1,
wherein the generated information includes information on a number of times the user has used the privilege-granting website.

3. A non-transitory computer-readable recording medium having stored therein a program for causing a computer to execute a privilege receiving opportunity notification process comprising:
providing a registered member website where a list of privileges a registered member can obtain at a privilege-granting website is displayed;
acquiring location information that identifies a site accessed by a user;
determining whether the acquired location information is identical to location information of the registered member website;
when it is determined that the acquired location information is not identical to the location information of the registered member website, determining whether the acquired location information is identical to location information of the privilege-granting website; and
when the acquired location information is identical to the location information of the privilege-granting website, generating information which prompts the user to access the registered member website before accessing the privilege-granting website in order to acquire a privilege, and then notifying the user of the generated information.

4. A privilege receiving opportunity notification method comprising:
providing a registered member website where a list of privileges a registered member can obtain at a privilege-granting website is displayed;
acquiring location information that identifies a site accessed by a user, using a processor;
determining whether the location information is identical to location information of the registered member website, using the processor;
when it is determined that the acquired location information is not identical to the location information of the registered member website, determining whether the acquired location information is identical to location information of the privilege-granting website, using the processor; and
when the acquired location information is identical to the location information of the privilege-granting website, generating information which prompts the user to access the registered member website before accessing the privilege-granting website in order to acquire a privilege, and notifying the user of the generated information, using the processor.

* * * * *